Aug. 9, 1960   W. A. HADLEY ET AL   2,948,203
PHOTOCOMPOSING MACHINE
Filed Oct. 8, 1956   2 Sheets-Sheet 1

INVENTOR.
WILLIAM A. HADLEY
DANIEL H. ROBBINS
BY
ATTORNEYS

United States Patent Office 2,948,203
Patented Aug. 9, 1960

2,948,203

PHOTOCOMPOSING MACHINE

William A. Hadley, Tappan, and Daniel H. Robbins, Bronxville, N.Y., assignors to Mergenthaler Linotype Company, a corporation of New York Filed Oct. 8, 1956, Ser. No. 614,738

12 Claims. (Cl. 95—4.5)

This invention relates to photocomposing machines. More specifically, it is directed to a special form of film for use in a photocomposing machine as well as to a film advance detector and machine interlock.

In a modern photocomposing machine, and particularly one of the two-unit type (such as disclosed in copending application Ser. No. 419,012 filed March 27, 1954, and Patent No. 2,816,609, dated December 17, 1957) wherein a keyboard unit is provided to code a control tape and the coded tape thereafter used to control the operation of a photographic unit for film composition, it is not uncommon for the photographic unit to operate without direct constant supervision by a machine attendant. In fact, it is one of the attributes of a two-unit machine system that, after preparation, the coded tape can be placed in a reading or decoding apparatus and control the operation of the photographic unit. In this manner, a single attendant can supervise the operation of a number of photographic units or operate the keyboard unit to prepare a coded tape while a previously prepared tape is controlling operation of the photographic unit.

The control tape prepared in the keyboard unit comprises, generally, a series of code signals representative of a line of characters to be photographed in the photographic unit followed by an end-of-line signal. This group of signals is followed by a similar group of signals for each line of composition to be photographed in the photographic unit. Other signals, of course, may appear on the control tape but they are not germane to the present invention. Furthermore, the end-of-line signal may be a quad-right, quad-left, center or justification signal, but since, for certain purposes of machine operation they all perform an identical control function, they are more generically designated as end-of-line signals.

The photographic unit comprises a font of characters selectably exposed by a shutter mechanism, a light source for illuminating the characters, an optical system for projecting a selected character to a photographic station and imaging it on a film located thereat, and mechanism for effecting a relative translation between the photographic position and the film so that successively exposed characters are imaged one after another for linear text composition. In the photographic unit disclosed in the aforementioned application Ser. No. 419,012, a line composing carriage (on which is mounted a mirror and projection lens) as reciprocated across the film to effect the letter by letter composition of a line, the remaining components (including the film and its magazine) being stationary. During the forward motion of the carriage, the imaging of characters takes place in response to the character signals on the tape. The linear extent of carriage advance in the forward direction is measured, as by a carriage-mounted grid plate traversing a light beam in a photocell unit, and it is this measured movement which controls the flashing of the light source to photograph a character on the film. If the carriage movement is arrested, then photographic action is suppressed and the advance of the control tape through the decoding mechanism is likewise arrested until such time as the carriage again moves in the forward direction.

After all of the characters represented by signals are imaged and recorded on film, the next following signal (which is an end-of-line signal) results in the reverse or return motion of the carriage. In response to the same end-of-line signal, mechanism is also actuated to advance the film in the film magazine and present an unexposed portion thereof at the photographic station in readiness for the imaging of the next line of characters. When the reverse motion of the carriage has carried it beyond the start-of-line position, the carriage is halted and immediately proceeds to move again in a forward direction for the photographing of the next line.

It is thus seen that one operation which constantly recurs in the automatic functioning of the photographic unit, is the line by line advance of the film in the film magazine as copy is photographed. It, therefore, becomes important to determine whether or not the film has advanced in response to an end-of-line signal. If the film has not been advanced, a succeeding line would be photographed upon a preceding line.

It is one feature of this invention to provide automatic means to detect the advance or lack of advance of film in the film magazine.

It is a further feature of the invention to provide a film to control said film advance detecting means.

In carrying out the invention, a photographic film is provided having along one edge thereof a succession of reference marks formed of an electrical conducting material. There is further provided electrical contacting means for co-acting with the conducting reference marks and for controlling electronic circuitry which is responsive to the advance of the film, involving relative movement between the reference marks and the electrical contacting means. The responsive means, in turn, control further photographic action and feed of the control tape through the reading or decoding unit. In the absence of film movement, operation of the photographic unit is stopped, as by suppressing photographic action and arresting advance of the control tape. A subsequent advance of the film in its magazine permits the photographing of characters to be reinitiated with the accompanying advance of the control tape.

Further features and advantages will be gained from the description of a preferred arrangement of the invention which follows.

Figure 1:
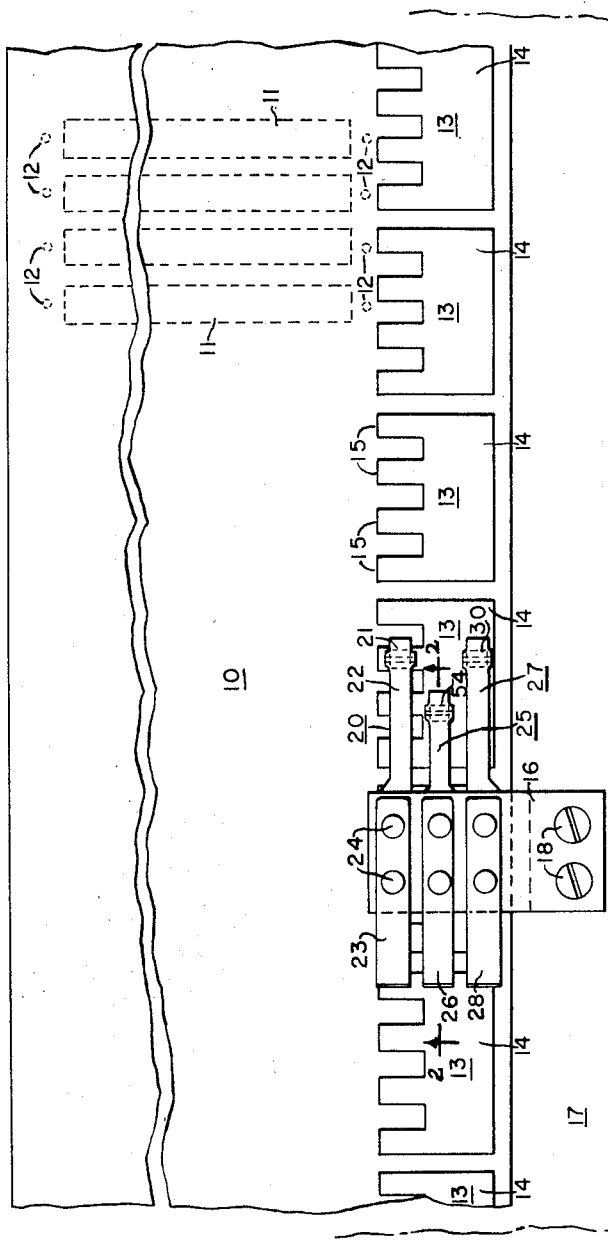
Fig. 1 is a view showing a segment of a film strip having a series of reference marks along one edge thereof and the electrical means for co-acting therewith.
Figure 2:
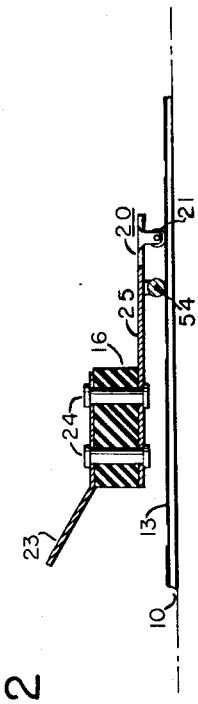
Fig. 2 is a sectional view taken along line 2—2 of Fig. 1.

Reference is made to Fig. 1 wherein is shown a segment of a sensitized film 10 utilized in the photocomposing machine and upon which latent images of composed lines of text are recorded. The exposed portions of the film are indicated by phantom lines 11 which represent the composed lines of text. At the ends of each composed line are perforations 12 which bear a predetermined relationship to the lines and are used for correction purposes when such is necessary. The perforations are punched in the film after the line with which they are associated is recorded and are then used to advance the film through the film magazine.

One edge portion of the film 10 is provided with a plurality of spaced reference marks 13 along its entire length. Each mark 13 is of a suitable electrical conducting material and may be placed on the film as by printing. A mark comprises a base portion 14 from which project four rake-like conducting strips 15 spaced apart a distance equal to the width of each individual strip. In a sample portion of film prepared for experimental purposes, the strips were sixty thousandths of an inch (0.060″) wide and the spacings between strips were sixty thousandths of an inch (0.060″) wide. As will later be seen, this permits film movements of sixty thousandths of an inch (0.060″) to be detected and thus permits the composition of type lines of small point size (e.g. 6 pt. pica). Of course, these sample dimensions are by way of illustration only, since actual dimensions will depend on the degree or amount of film movement to be detected. The dimensions of the base portions 14 and the length of the strips 15 transverse to the film need only be of a value to accommodate the electrical contacting means that cooperate with the reference marks. The spacing between individual reference marks is also sixty thousandths of an inch (0.060″). Thus the distance between corresponding points on two successive reference marks will be four hundred and eighty thousandths of an inch (0.480″) or approximately one-half inch. This latter measurement will be utilized to indicate the total amount of film advanced, in a way hereinafter described.

The electrical contacting means which cooperate with the conducting reference marks 13 are shown mounted on an L-shaped bracket 16 which is fastened to a member 17 of the film magazine by a pair of screws 18. The bracket is formed of an insulating material and the contact carrying part thereof is aligned with reference marks 13 which pass the bracket as the film is advanced.

A contacting member 20, which co-acts with strips, includes a roller contact 21 carried by a conductive leaf spring 22. The spring, in turn, is electrically connected to a conductor 23 by a pair of rivets 24 which pass through the insulator bracket 16. A contacting member 25 (which includes a roller contact 54) is similarly connected to conductor 26 and a contacting member 27 (which includes a roller contact 30) is also similarly connected to conductor 28.

Figure 3:
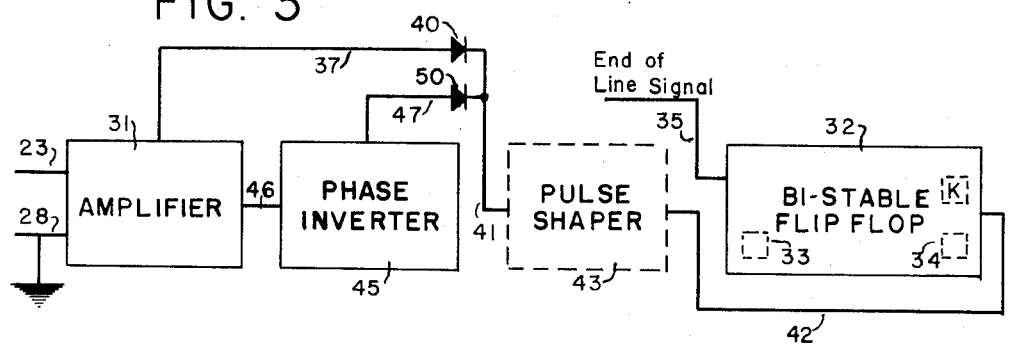
Fig. 3 is a block diagram showing schematically a circuit controlled by movement of the film.

Reference will now be made to Fig. 3 which shows in block form the circuits to which conductors 23 and 28 are connected and, therefore, control. These two conductors, considered with respect to each other, form a switch which is closed when both roller contacts 21 and 30 engage the conducting material of a reference mark 13. The switch is open when one of the roller contacts, e.g., contact 21, engages the non-conducting portion of film 10 which lies between strips 15. The switch is also open when both contacts 21 and 30 engage the non-conducting film, as between reference marks.

The circuit will be considered for the conditions illustrated, that is, both contacts 21 and 30 are in engagement with the conducting material of a reference mark 13 and, consequently, the switch formed thereby is closed to provide a short circuit. The amplifier 31 (which may be a standard triode tube amplifier) is in a conducting state. Conductors 23 and 28 are connected to a cathode resistor and, in their present short circuiting state, the resistor is shorted out, which shorting action when it first occurred permitted the triode tube to conduct. The remaining circuit elements are in a quiescent state, and in bi-stable multi-vibrator 32, electron tube 33 is non-conducting while electron tube 34 is conducting to energize relay coil K which is connected in the tube plate circuit. Since coil K is energized, the relay contacts controlled thereby are actuated, i.e., contacts K1 (Fig. 4) are separated and contacts K2 are engaged.

Figure 4:
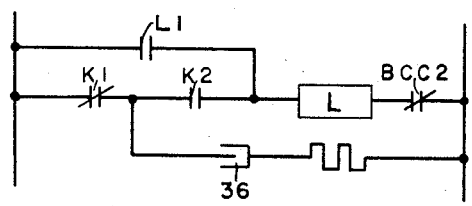
Fig. 4 is a schematic representation of a relay circuit controlled by the circuit of Fig. 3.

It will be assumed that an end-of-line signal is decoded in the photocomposing machine. As hereinabove noted, this will act to reverse the projection lens carriage motion to bring the carriage to its start-of-line position. In addition, the signal will activate the film magazine (see Patent No. 2,845,012, dated July 29, 1958 and copending application Ser. No. 614,736 filed October 8, 1956) to advance the film and bring an unexposed portion thereof to the photographic station preparatory to the photographing of the next line of characters. Furthermore, in accordance with the teachings of the present invention, the end-of-line signal will be transmitted to multi-vibrator 32 by means of conductor 35. The signal to multi-vibrator 32 will be in the form of a negative pulse which will result in tube 33 conducting and tube 34 becoming non-conductive. Therefore, relay coil K is deenergized and contacts K1 and K2 revert to their normal state as shown in Fig. 4. Thus, a circuit is completed to charge capacitor 36.

If in response to the end-of-line signal, film 10 is advanced in the film magazine, the short circuit between contacts 21 and 30 will be interrupted, as by contact 21 engaging the non-conducting film between strips 15. With the short circuit interrupted, the cathode resistor of amplifier 31 is restored to the circuit to raise the cathode voltage and extinguish the tube. The plate voltage immediately rises and a positive voltage pulse is generated and transmitted through conductor 37 and uni-directional current device 40 to conductor 41. If the circuit parameters are such that the positive pulse is properly shaped, conductor 41 may lead direct to conductor 42 and multi-vibrator 32. If the pulse requires proper shaping, conductor 41 will lead to a pulse shaper 43, the output of which will lead to conductor 42 and multi-vibrator 32. It is thus clear that the provision of a pulse shaper is determined solely by the pulse shape requirements of multi-vibrator 32 and the pulse characteristics of the other circuit components.

The positive pulse from amplifier 31 restores multi-vibrator to its original condition described above. That is, tube 34 becomes conducting to again energize coil K and tube 33 is cut off. Contacts K1 separate and contacts K2 engage, the latter contacts permitting capacitor 36 to discharge through relay coil L and energize the coil to engage contacts L1 and L2. Contacts L1 complete a self-holding circuit for the coil L which remains energized until contacts BCC2 separate, as hereinafter described.

Figure 5:
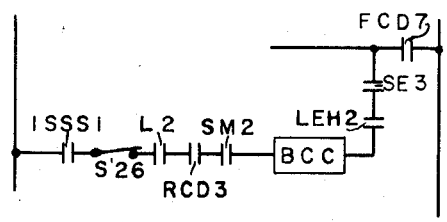
Fig. 5 is a schematic representation of a relay circuit controlled by the circuit of Fig. 4.

Fig. 5, in which is found contacts L2, is a relay coil circuit taken from Fig. 22 of aforementioned copending application Ser. No. 419,012. All of the contacts shown in Fig. 5, with the exception of contacts L2, as well as relay coil BCC, have been given the reference characters assigned thereto in the copending application. In this manner, the control of the coil BCC and, in turn, the control exercised by the relay coil on the physical operation of the photocomposing machine can be understood by reference to the copending application, particularly page 49, line 2, et. seq.

If, as presently assumed, contacts L2 are engaged, thus indicating that the film in the magazine has been advanced in response to an end-of-line signal, relay coil BCC circuit can operate in normal fashion to permit non-interrupted functioning of the photographic unit. Energization of coil BCC, in addition to its other function of controlling the forward motion of the projection lens carriage, also results in the separation of contacts BCC2 after a time delay (inasmuch as the relay is of the time delay type), and the consequent deenergization of coil L. The circuit is thus in the condition in which it started and in readiness for a subsequent detection operation.

Assuming next that the film did not advance in response to the end-of-line signal, contacts 21 and 30 are connected by the conducting reference mark, and the cathode resistor of amplifier 31 remains shorted and the tube thereof conducting. Hence there is no voltage pulse. Relay K had been previously rendered inoperative by the end-of-line signal negative pulse triggering multi-vibrator 32 to its stable state wherein tube 33 conducts and tube 34 is quiescent. Therefore, relay L does not become energized and contacts L2 do not engage. Consequently, a circuit for relay coil BCC is not completed. The nonenergization of coil BCC prevents the deenergization of coil FCD and the forward movement of the projection lens carriage. Hence the desired result obtains, that is, the photographic action is suppressed when the film is not advanced in response to the end-of-line signal. By halting the lens carriage in its forward direction of travel, the feed of the control tape through the decoding mechanism is also arrested. The means whereby this is accomplished are more fully described in the aforementioned patent application Ser. No. 419,012. A movement of the film will immediately result in energization of coil L and the re-inauguration of automatic operation of the photographic unit.

The circumstance has been considered where contact 21 moves from a conducting strip 15 to a non-conducting film section intermediate the strips 15. The same results will obtain when both contacts 21 and 30 move from the conducting material to the film, as when moving from one reference mark to the next following one. The reverse situation (wherein contact 21 alone moves or both contacts 21 and 30 move, from the non-conducting film section to a strip 15) explains the presence of phase inverter 45.

When one or both of contacts 21 and 30 engage non-conducting film material, the cathode resistor of amplifier 31 is not shorted out, with the result that the amplifier tube is conducting. An advance of the film, which causes both contacts to engage a conducting reference mark 13, shorts the cathode resistor, and initiates conduction in the amplifier, thus producing a negative pulse at the amplifier tube plate. Unidirectional current device 40 prevents this pulse being transmitted to multi-vibrator 32 (or pulse shaper 43, when provided). The pulse is transmitted, however, through conductor 46 to the phase inverter 45. This is simply another triode tube amplifier which had been conducting, but which when receiving the negative pulse is cut off. A positive voltage pulse is generated as the plate voltage rises and this pulse is transmitted through conductor 47 and unidirectional current device 50 to a multi-vibrator 32 (or pulse shaper 43). It is thus apparent that in steady state circumstances, either amplifier 31 or phase inverter 45 is conducting and that, when the film is advanced either to bring contacts 21 and 30 from a position in engagement with conducting material to one out of such engagement or to bring the contacts from a position out of engagement with the conducting material to one in engagement, a positive pulse is transmitted to multi-vibrator through conductor 41.

It is to be noted that, in response to an end-of-line signal which triggers multi-vibrator to cut-off tube 34 and deenergizes relay coil K and initiate conduction in tube 33, it is immaterial how many pulses are generated by amplifier 31 and phase inverter 45 due to a relatively long advance of the film (as for instance in composing type lines of large point size), since only the first such pulse generated will act to trigger the multi-vibrator and restore it to the stable state where tube 34 conducts and relay coil K is energized.

Figure 6:
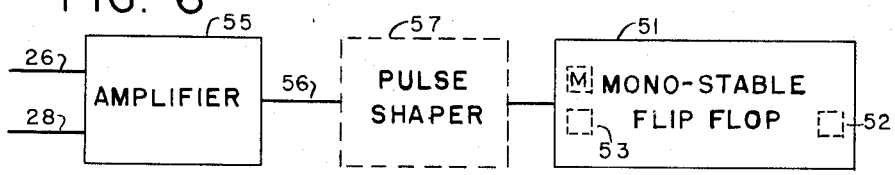
Fig. 6 is a block diagram showing schematically another circuit controlled by movement of the film.
Figure 7:
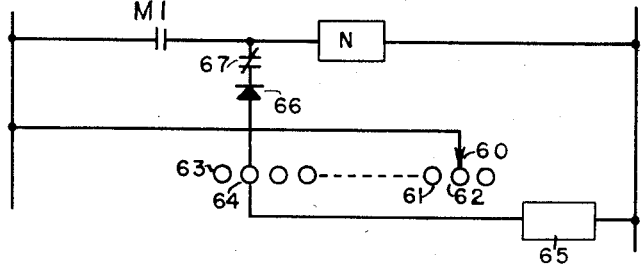
Fig. 7 is a schematic representation of a relay and counter circuit controlled by the circuit of Fig. 6.

The circuit shown in Fig. 6 also includes a multi-vibrator 51, but in this instance it is a mono-stable device with tube 52 normally conducting and tube 53 non-conducting. Relay coil M is wired into the plate circuit of tube 53. Conductors 26 and 28, which are connected respectively to roller contact members 54 and 30, permit the short circuiting of a cathode resistor in the triode tube amplifier 55 and thereby control the conduction or non-conduction of the amplifier tube. Under conditions as illustrated in the drawing, as with both contact members 54 and 30 engaging a conducting reference mark 13, the cathode resistor is shorted and the amplifier tube is conducting. If the connection between contact members 54 and 30 is interrupted, as by contact 54 engaging the non-conducting film between reference marks, the short circuit is removed from around the cathode resistor and the tube is extinguished. This results in the voltage at the plate increasing in value to produce a positive pulse. In the present circuit, positive pulses are not utilized and so the removal of the short circuit as described is without effect. A subsequent or continued advance of the film will cause both contacts 54 and 30 to again be cooperatively connected, as by engaging a conducting reference mark 13, and therefore short circuit the cathode resistor of the amplifier tube and initiate conduction of amplifier 55. The plate voltage thereupon falls from B+ value to a value dependent on the plate resistor drop. In other words, a negative voltage pulse is generated. The pulse is transmitted over conductor 56 to multi-vibrator 51 which it triggers, causing tube 52 to be extinguished and tube 53 to fire. As with the circuit of Fig. 3, a pulse shaper 57 may be provided so that the pulse transmitted to multi-vibrator 51 is of the proper form. Consequently, relay coil M is energized and contacts M1 (Fig. 7) are engaged. Since the multi-vibrator is of mono-stable design, the firing of tube 53 and the energization of coil M is of a duration approximately coextensive with the length of the negative voltage pulse. At the termination of the pulse, multi-vibrator 51 reverts to its stable condition wherein tube 52 is conducting and tube 53 is extinguished.

The momentary energization of coil M, accompanied by the engagement and separation of contacts M1, causes stepping switch coil N to be energized and deenergized, with the result that stepping switch brush 60 advances one position to the next succeeding contact 61 of the stepping switch. A total of twenty-six contacts are provided on the stepping switch and they are circularly arranged so that as brush 60 steps from one contact to a succeeding one it will return to the first contact 62 after leaving the twenty-sixth contact 63. The twenty-fifth contact 64 is connected to the decimal counter coil 65 (a Veeder-Root counter will be satisfactory) and, also, through rectifier 66 and the stepping switch interrupter contact 67 to stepping switch coil N. Consequently, every time brush 60 engages twenty-fifth contact 64, the counter coil 65 will be energized, as will stepping switch coil N. Immediately, interrupter contacts 67 separate and brush 60 steps to the twenty-sixth contact 63. Counter coil 65 is deenergized and the counter actuated to indicate the next highest count thereof. The next operation of contacts M1 will cause brush 60 to step to the first contact 62. Rectifier 66 prevents a circuit being completed for counter coil 65 through contacts M1 and the interrupter contacts 67. It is to be noted that even though twenty-six contacts are provided on the stepping switch, brush 60 engages twenty-fifth contact 64 every twenty-fifth operation of contacts M1. This, of course, is due to the one self-stepping operation of the switch during each cycle of operations.

Recalling the dimensions heretofore specified for the reference marks, it will be observed that a linear film advance of one foot will cause twenty-five reference marks 13 to pass under contacting members 54 and 30 with twenty-five consequent operations of contacts M1. The counter, therefore, will serve as a film gauge, indicating the number of feet of film exposed in the operation of the photocomposing machine.

Having thus described the invention, it is to be understood that many apparent modifications and variations thereof can be made without departing from the spirit and scope of the invention, and, therefore, it is intended that the drawings and description be interpreted as illustrative and not in a limiting sense.

For example, the electric conducting reference marks on the film could be replaced by similarly disposed notches or perforations which would control mechanical switches substituted for the electric contacts of the embodiment herein illustrated.

As another example, while the automatic film detector herein shown and described actually functions as a safety device to permit or prevent the operation of the photographic composing machine, the detector could be arranged to operate a signal of some kind such as a visual indicator or alarm, either in addition to or independently of its safety function.

What is claimed is:

1. In a photocomposing machine, the combination of a font of characters which are selectively imaged at a photographic station, a sensitized film on which lines of type characters are imaged, one after another, in column formation, and means responsive to signalling means to advance the film after the imaging of one line of characters thereon to present an unexposed portion thereof at the photographic station preparatory to the imaging of the succeeding line of characters, characterized in that the sensitized film has a plurality of electrically conducting reference marks arranged in spaced relation along one edge portion thereof, and including electrical means for cooperating with said reference marks to detect and indicate the advance or non-advance of said film.

2. In a photocomposing machine, the combination according to claim 1 including additional means for preventing the continued operation of the photocomposing machine in the event that an advance of the film does not occur in response to the signalling means.

3. In a photocomposing machine, the combination according to claim 1, wherein the conducting reference marks are of a predetermined dimension lengthwise of the film, and including counting means actuated by a predetermined advance of the film whereby a measurement of the amount of film exposed is obtained.

4. In a photocomposing machine, the combination of a font of characters which are selectively imaged at a photographic station, a sensitized film on which lines of type characters are imaged, one after another, in column formation, and means responsive to signalling means to advance the film after the imaging of one line of characters thereon to present an unexposed portion thereof at the photographic station preparatory to the imaging of the succeeding line of characters, characterized in that the sensitized film has a plurality of reference marks along one edge portion thereof, each of said marks having a crenate edge of alternating conducting and nonconducting strips, a pair of electrical contacting members for cooperating with said reference marks, one of said members engaging the crenate edge of the marks, and electrical circuit means controlled by said contacting members to detect and indicate the advance or non-advance of said film.

5. In a photocomposing machine, the combination according to claim 4, wherein said electrical circuit means is first activated in response to the film advance signalling means and thereafter restored to its normal steady state condition as by the advance of said film.

6. In a photocomposing machine, the combination according to claim 5, including means responsive to the non-restoration of the electrical circuit means after its activation by the film advance signalling means for preventing further operation of the machine.

7. In a photocomposing machine, the combination according to claim 6, including a carriage for effecting relative displacement between the photographic station and the sensitized film whereby character images are imaged in side by side relationship on said film and mechanism carried by said carriage for controlling the time of photographic action, characterized in that the means for preventing machine operation is effective to arrest the motion of the carriage in a line composing direction and thereby suppress photographic action.

8. In a photocomposing machine, the combination of a font of characters which are selectively imaged at a photographic station, a sensitized film on which lines of type characters are imaged, one after another, in column formation, and means responsive to signalling means to advance the film after the imaging of one line of characters thereon to present an unexposed portion thereof at the photographic station preparatory to the imaging of the succeeding line of characters, characterized in that the sensitized film has a plurality of electrically conducting reference marks along one edge portion thereof, said marks being of a predetermined dimension and spaced apart a predetermined distance, a pair of electrical contacting members for cooperating with said reference marks, electrical circuit means actuated by said members as the film is advanced to cause one of said members to move out of contact with a reference mark, and counter means operative after a predetermined number of actuations of said electrical circuit means, whereby a measurement of the film advance is obtained.

9. In a photocomposing machine, the combination of a font of characters which are selectively imaged at a photographic station, a sensitized film on which lines of type characters are imaged, one after another, in column formation, means responsive to signalling means to advance the film after the imaging of one line of characters thereon to present an unexposed portion thereof at the photographic station preparatory to the imaging of the succeeding line of characters, and automatic means for detecting and indicating whether or not the film has been advanced after the composition of a line, said detecting and indicating means comprising an electric circuit which is alternately energized and deenergized by the line-by-line advance of the film under control of reference marks spaced apart along one edge portion of the film.

10. The combination according to claim 9, including additional means for preventing the continued operation of the photocomposing machine in the event that an advance of the film does not occur in response to the signalling means.

11. In a photocomposing machine, the combination of a font of characters which are selectively imaged at a photographic station, a sensitized film on which lines of type characters are imaged, one after another, in column formation, means responsive to signalling means to advance the film after the imaging of one line of characters thereon to present an unexposed portion thereof at the photographic station preparatory to the imaging of the succeeding line of characters, and automatic means controlled by reference marks spaced apart along one edge portion of the film to permit or prevent the operation of the machine according to whether or not the film has been advanced after the composition of a line.

12. In a photocomposing machine, the combination of a font of characters which are selectively imaged at a photographic station, a sensitized film on which lines of type characters are imaged, one after another, in column formation, means responsive to signalling means to advance the film after the imaging of one line of characters thereon to present an unexposed portion thereof at the photographic station preparatory to the imaging of the succeeding line of characters, and automatic means controlled from the film to permit or prevent the operation of the machine according to whether or not the film has been advanced after the composition of a line, said automatic means including two electric circuits, one of which is energized by the advance of the film to permit the operation of the machine, and the other one of which is energized by the non-advance of the film to prevent the operation of the machine, and said circuits being controlled by reference marks spaced apart along one edge portion of the film.

References Cited in the file of this patent

UNITED STATES PATENTS

| | | |
|---|---|---|
| 1,224,300 | Hoyt | May 1, 1917 |
| 1,262,657 | Ford | Apr. 16, 1918 |
| 1,565,897 | Bouin | Dec. 15, 1925 |
| 1,858,792 | Merle | May 17, 1932 |
| 2,229,689 | Westover | Jan. 28, 1941 |
| 2,248,293 | Woolf | July 8, 1941 |
| 2,388,961 | Elliott | Nov. 13, 1945 |
| 2,537,529 | Hessert | Jan. 9, 1951 |